United States Patent
Jaamies

[19]
[11] Patent Number: 6,138,037
[45] Date of Patent: Oct. 24, 2000

[54] IMPLEMENTATION OF SIGNALLING IN A TELECOMMUNICATIONS NETWORK

[75] Inventor: Juhani Jaamies, Espoo, Finland

[73] Assignee: Nokia Telecommunications Oy, Espoo, Finland

[21] Appl. No.: 09/418,386

[22] Filed: Oct. 14, 1999

Related U.S. Application Data

[63] Continuation of application No. PCT/FI98/00319, Apr. 9, 1998.

[30] Foreign Application Priority Data

Apr. 23, 1997 [FI] Finland .................................. 971725

[51] Int. Cl.[7] ................................................ H04Q 7/00
[52] U.S. Cl. ................................. 455/560; 370/328
[58] Field of Search ....................... 455/560, 561, 455/452, 453; 370/328, 329, 332, 344

[56] References Cited

U.S. PATENT DOCUMENTS 5,297,144  3/1994  Gilbert et al. .

FOREIGN PATENT DOCUMENTS

| 544 975 | 6/1993 | European Pat. Off. . |
| 2291568 | 1/1996 | United Kingdom . |
| WO 92/17956 | 10/1992 | WIPO . |
| WO 95/01015 | 1/1995 | WIPO . |
| WO 95/20283 | 7/1995 | WIPO . |

*Primary Examiner*—Douglas W. Olms
*Assistant Examiner*—David R Vincent
*Attorney, Agent, or Firm*—Altera Law Group

[57] ABSTRACT

The invention relates to a implementing signalling in a telecommunications network, particularly in a mobile network. In the method, one network element (BSC) serves as a master element and several other network elements serve as slave elements (BTS1 ... BTS4) sending a transmission request for signalling information to the master element which assigns transmission turns in accordance with received transmission requests. The signalling is implemented on a signalling channel common to the slave network elements, comprising at least one time slot of the transmission frame, or part of such a time slot. In order that the transmission requests might be forwarded to destination rapidly without unnecessarily occupying transmission capacity, in the transmission from the slave elements to the master element (a) the capacity of the signalling channel used is divided into a first subchannel on which transmission requests are sent and to a second subchannel on which actual signalling information is sent, and (b) the subchannel allocated to transmission requests is further divided between several different base stations in such a way that a predetermined bit from the same time slot of the transmission frame is assigned for the use of transmission requests of each base station, and thus several different slave elements can send a transmission request simultaneously to the master element.

6 Claims, 4 Drawing Sheets

IMPLEMENTATION OF SIGNALLING IN A TELECOMMUNICATIONS NETWORK

This application is a continuation of PCT/FI98/00319 filed Apr. 9, 1998.

FIELD OF THE INVENTION

The invention relates generally to implementation of signalling in a telecommunications networks, particularly to signalling between a base station and a base station controller in a mobile network.

BACKGROUND OF THE INVENTION

To illustrate the typical architecture of a mobile network, FIG. 1 shows the structure of the known GSM mobile communications system (Global System for Mobile Communications), using abbreviations known from the context of the GSM system. The system comprises several open interfaces. The transactions relating to crossing of interfaces have been defined in the standards, in which context the operations to be carried out between the interfaces have also been largely defined. The network subsystem (NSS) of the GSM system comprises a mobile services switching centre (MSC) through whose system interface the mobile network is connected to other networks, such as a public switched telephone network (PSTN), an integrated services digital network (ISDN), other mobile networks (Public Land Mobile Networks PLMN), and packet switched public data networks (PSPDN) and circuit switched public data networks (CSPDN). The network subsystem is connected across the A interface to a base station subsystem (BSS) comprising base station controllers (BSC), each controlling the base transceiver stations (BTS) connected to them. The interface between the base station controller and the base stations connected thereto is the Abis interface. The base stations, on the other hand, are in radio communication with mobile stations across the radio interface.

The GSM network is adapted to other networks by means of the interworking function (IWF) of the mobile services switching centre. On the other hand, the mobile services switching centre is connected to the base station controllers with PCM trunk lines crossing the A interface. The tasks of the mobile services switching centre include call control, control of the base station system, handling of charging and statistical data, and signalling in the direction of the A interface and the system interface.

The tasks of the base station controller include, inter alia, the selection of the radio channel between the controller and a mobile station MS. For selecting the channel, the base station controller must have information on the radio channels and the interference levels on the idle channels. The base station controller performs mapping from the radio channel onto the PCM time slot of the link between the base station and the base station controller (i.e., onto a channel of the link). The establishment of the connection will be described in closer detail in the following.

The base station controller BSC schematically shown in FIG. 2 comprises trunk interfaces 21 and 22 through which the BSC is connected to the mobile services switching centre across the A interface on the one hand and to the base stations across the Abis interface on the other hand. The transcoder and rate adaptation unit TRAU forms part of the base station system and may be incorporated into the base station controller or the mobile services switching centre. For this reason, the unit is shown in broken line in FIG. 2. The transcoders convert speech from a digital format to another, for example convert the 64 kbit/s PCM signals arriving from the mobile services switching centre across the A interface into 13 kbit/s coded speech signals to be conveyed to the base station, and vice versa. Data rate adaptation is performed between the speed 64 kbit/s and the speed 3.6, 6, or 12 kbit/s. In a data application, the data does not pass through the transcoder.

The base station controller configures, allocates and controls the downlink circuits. It also controls the switching circuits of the base station via a PCM signalling link, thus enabling effective utilization of PCM time slots. In other words, a branching unit at a base station, which is controlled by the base station controller, connects the transmitter/receivers to PCM links. Said branching unit transfers the content of a PCM time slot to the transmitter (or forwards it to the other base stations if the base stations are chained) and adds the content of the receive time slot to the PCM time slot in the reverse transmission direction. Hence, the base station controller establishes and releases the connections for the mobile station. Multiplexing of the connections from the base stations to the PCM link(s) crossing the A interface, like the reverse operation, is carried out in switching matrix 23.

The layer 1 physical interface between the base station BTS and the base station controller BSC is in this example a 2048 kbit/s PCM line, i.e. comprises 32 64 kbit/s time slots (=2048 kbit/s). The base stations are fully under the control of the base station controller. The base stations mainly comprise transmitter/receivers providing a radio interface towards the mobile station. Four full-rate traffic channels arriving via the radio interface can be multiplexed into one 64 kbit/s PCM channel between the base station controller and the base station, and hence the speed of one speech/data channel over this link is 16 kbit/s. Hence, one 64 kbit/s PCM link may transfer four speech/data connections.

FIG. 1 also shows the transfer rates used in the GSM system. The mobile station MS transmits speech data across the radio interface on the radio channel for example at the standard rate 13 kbit/s. The base station receives the data of the traffic channel and switches it to the 64 kbit/s time slot of the PCM link. Three other traffic channels of the same carrier are also located in the same time slot (i.e., channel), and hence the transfer rate per connection is 16 kbit/s, as stated previously. The transcoder/rate adaptation unit TRAU converts the encoded digital information to the rate 64 kbit/s, and at this rate the data is transferred to the mobile services switching centre. If the transcoder/rate adaptation unit is incorporated into the mobile services switching centre, maximum advantage is gained from compressed speech in data transmission.

The implementation of transmission between the base stations and base station controllers forms an essential part of the costs of the mobile network. With a growing number of network users and an increasing number and density of base stations, the significance of efficient and economic transmission solutions is emphasized even more. For signalling, this means among other things that it must be possible to perform the requisite signalling between the base station and its controller rapidly and reliably.

Present-day mobile networks as a rule have fixed two-way signalling channels between each base station and base station controller. The use of fixed channels presupposes that the transmission channels and the associated signalling channels are planned in advance and programmed in the network elements of the transmission network. Information on which time slot is used by the base station for signalling is programmed in the base station in the start-up phase. Also the cross-connects possibly provided in the transmission network must have the corresponding switching information.

Such a solution has the drawback of needing considerable planning and maintenance for the signalling channels. Since the channels must be routed through the entire network, it is difficult to take into use new base stations on account of the required definitions relating to the entire network. Furthermore, a complex network management system is required for maintenance.

Another drawback related to signalling in the known mobile networks is the fact that base station-specific, permanently allocated signalling channels require extra capacity, since they are reserved irrespective of signalling needs. This drawback is accentuated particularly in small-capacity base stations the proportion of which in mobile networks is significantly on the increase.

When network capacity has been increased, the coverage areas of individual base stations have been reduced, whereby the traffic fluctuations at an individual base station have increased. While this being the case the radio path is no longer necessarily concentrative, it is worth-while to perform concentration in the data transfer between the base station and the base station controller. This affords considerable economic savings, as the number of transmission links and of connection ports at the base station controller may be smaller than heretofore. When the transmission between the base stations and the base station controller is concentrative, totally novel solutions are needed, however.

For signalling, this means in addition to the above-mentioned rapidity and reliability that signalling must not occupy unnecessary capacity from other traffic. Also, it is desirable that the implementation of the signalling channels would not require laborious pre-planning of the kind described above and that network changes, such as adding or removal of base stations, could be performed as easily as possible.

In addition to the above facts, it is desirable that the signalling would use 64 kbit/s channels or multiples thereof, since in that case the transmission equipment need not be capable of switching parts of time slots. A signalling channel having a minimum capacity of 64 kbit/s in practice results in a solution in which the base stations use a common signalling channel.

In the known common channel solutions, the crucial point is the allocation of a channel. Generally known access principles of common transmission media include the master-slave principle, contention principle, and transmission notice principle. The following will describe briefly what the implementation of these principles to a mobile network would mean.

In implementing the master-slave solution, one of the network elements (base station controller) serves as a master element and interrogates each slave element (base station) in turn if it has anything to transmit. When detecting a slave network element requesting a transmission turn, the master network element allocates a common channel for the use of this slave network element.

When operating on the contention principle, a base station requesting a transmission turn starts its transmission on the common channel, disregarding the other base stations. If the common channel is not currently busy, this transmission request will get through the channel to the base station controller, which starts an exchange of information with the base station. If the base station controller detects a collision or the base station does not receive a response within a predetermined time, the base station repeats its transmission.

In using the transmission notice principle, the base station controller polls the base stations jointly at given intervals as to whether they have anything to transmit. Base stations requesting transmission register, whereafter the base station controller grants them a permission to transmit in turn. Also in this method, collisions of transmission requests and recovery from these must be prepared for.

In implementing the above-described known common channel solutions, the drawback would reside particularly in the slow passage of transmission requests from the base stations. In the master-slave solution, the waiting time is directly increased as the number of base stations increases. In the contention principle, the passage of the transmission request is uncertain and successive collisions may occur, especially at network peak loads. The same problems also apply to a network employing the transmission notice principle.

SUMMARY OF THE INVENTION

It is an object of the present invention to eliminate the drawbacks described above and to provide a signalling solution wherewith the above-described objects can be achieved.

This object is achieved with the solution defined in the independent claim.

The idea of the invention is to divide the capacity of the signalling channel in the uplink direction between transmission requests and actual signalling information in such a way that in each time slot in the subchannel allocated to transmission requests, or in part of said time slot, each of the bits is reserved for the use of a specific base station. In this way, several base stations can send a transmission request simultaneously, so that the base station controller receives the requests of all of them (no collisions).

The solution of the invention permits implementation of signalling between the base stations and the base station controller on a channel common to the base stations rapidly (without collisions) and without wasting transmission capacity. The signalling channels need not be planned, and therefore the installation of new base stations is simplified.

An additional advantage of the invention is that the base stations can be combined with a simple addition operation. Therefore, no cross-connects and related databases are needed in the transmission network.

BRIEF DESCRIPTION OF THE DRAWINGS

In the following, the invention and its preferred embodiments will be described in detail with reference to examples in accordance with the accompanying drawings, in which.

DETAILED DESCRIPTION OF THE INVENTION

In accordance with the invention, the capacity of the signalling channel between the base stations and their base station controller is divided in the uplink direction between transfer of transmission request information and actual signalling information from the base stations. In the downlink direction, the capacity is allocated solely to signalling information. As will be described hereinbelow, in that direction the same information is transmitted to all base stations. Each base station can pick the information intended for it for example by means of its address.

Figure 1:
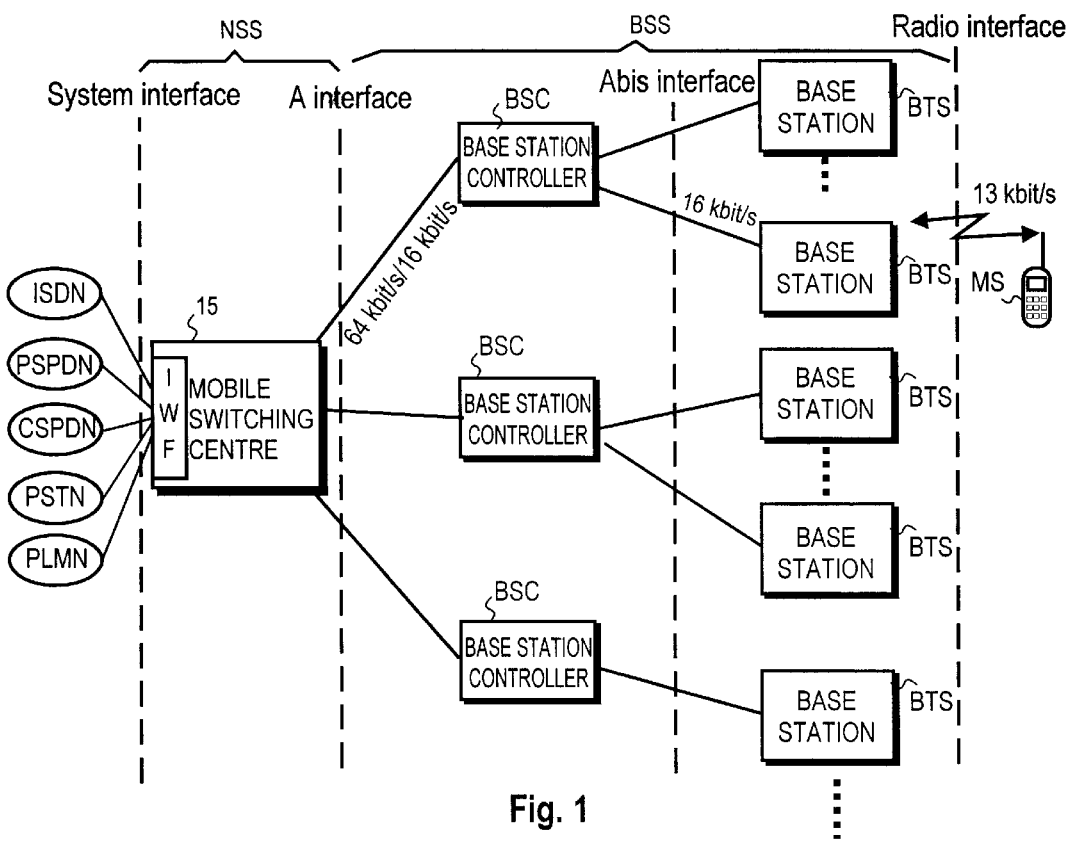
FIG. 1 illustrates the architecture of a GSM mobile network.
Figure 2:
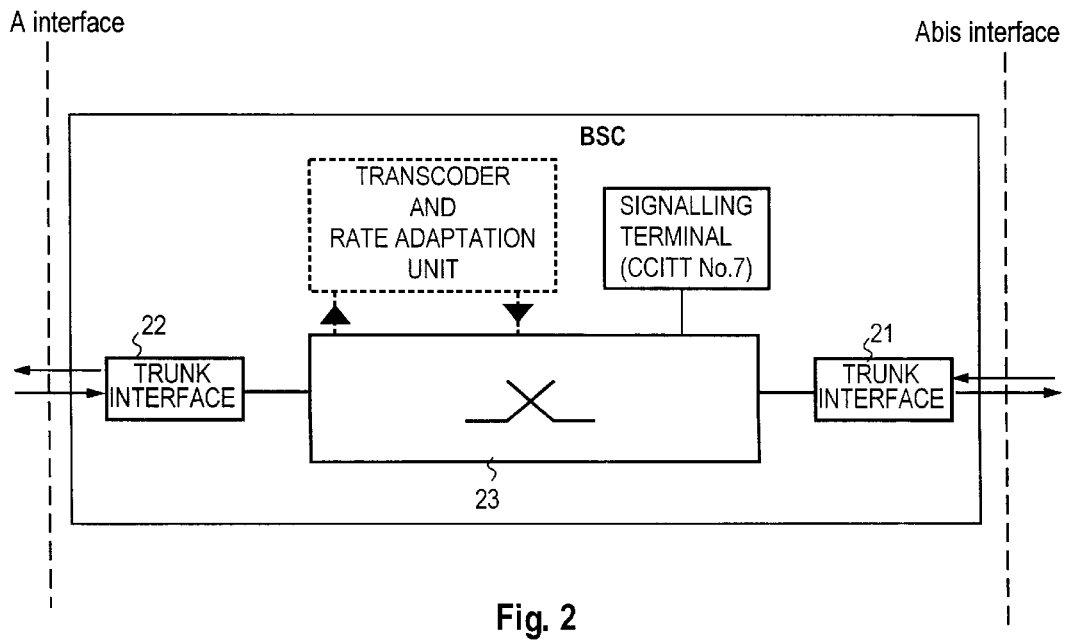
FIG. 2 is a schematic illustration of a base station controller.
Figure 3:
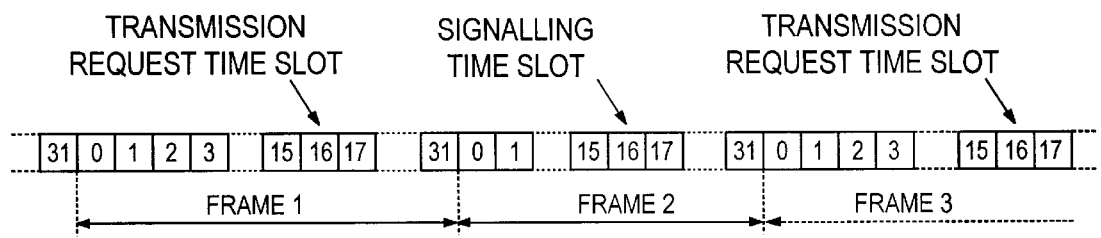
FIG. 3 illustrates the adaptation of a signalling channel to a transmission frame employed in the transmission path.

FIG. 3 shows the adaptation of a signalling channel to the frame structure of a 2048 kbit/s signal in accordance with the ITU-T recommendations G.703/G.704, in which the common signalling time slot is time slot 16 in the frame (the entire frame has time slots 0 . . . 31).

In this exemplary case, the signalling time slot is used for transmission requests sent by base stations in every other frame, and for actual signalling from (a) base station(s) to a base station controller in every other frame. Hence, transmission requests are transmitted in time slots 16 of odd frames and signalling from the base stations that have sent a transmission request and which the base station controller has granted permission to transmit is transmitted in time slots 16 of even frames.

The division of the capacity of the signalling channel which is made up by time slots 16 of successive frames between transmission requests and signalling need not be in accordance with the present example (50/50), but the proportions may be selected according to signalling needs. For example, transmission requests may be transmitted in every third frame or even less frequently.

The time slots used for signalling may also be freely selected. The capacity of the signalling channel may be increased by assigning additional time slots for signalling use, and the transmission requests and actual signalling may use different time slots, also in such a way that new transmission requests are transmitted in the same frame as the signalling relating to the previous transmission requests.

Figure 4:
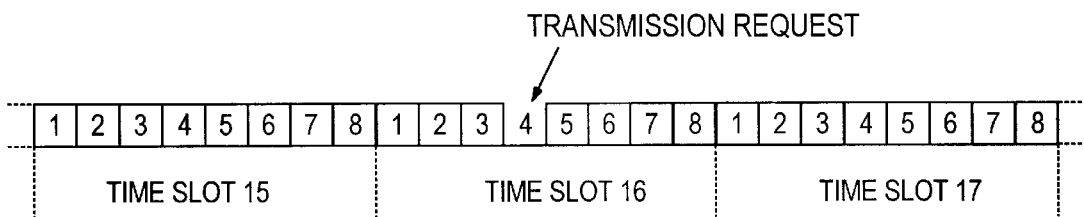
FIG. 4 illustrates the operation of the transmission request time slot in the transmission frame.

The operation of a transmission request time slot is illustrated in FIG. 4. A specific transmission request bit from the transmission request time slot is defined at the base station controller in the installation phase. By changing the state of this bit, the base station informs the base station controller that it has something to transmit. As the time slot comprises eight bits, eight base stations can send a transmission request simultaneously without any collision. One eight-bit transmission request time slot may also be divided between more than eight base stations by using common transmission request bits. In that case, however, the base station controller must interrogate the base stations using said bit as to which of them has something to transmit. FIG. 4 shows a situation where the base station associated with bit 4 has sent a transmission request to the base station controller.

The base station controller maintains a list of base stations that have sent a transmission request and grants a transmission turn to base stations that have sent a request on the reverse signalling channel. Signalling information of one or more base stations that have requested for permission can be transmitted in the same frame, and the signalling information may be carried by one or more time slots of the frame. In assigning the transmission turns, known principles may be used, and hence they will not be described in detail in this context.

Figure 5:
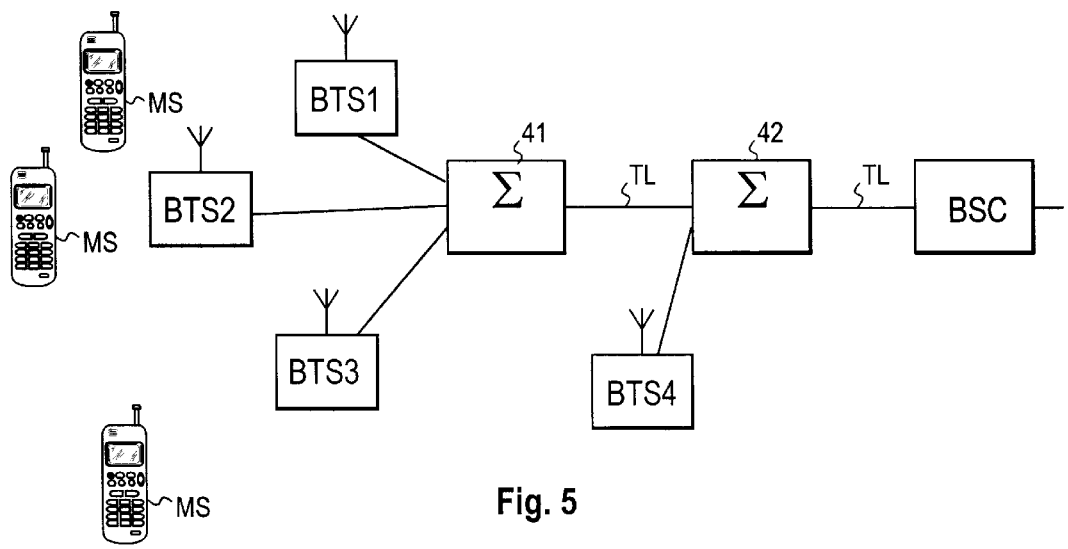
FIG. 5 depicts a mobile network in which the signalling system of the invention is employed.

The signalling method of the invention may be used for example in the network shown in FIG. 5, which is particularly suitable for implementing the signalling method, as transmission requests arriving from different base stations can be very simply combined into the same time slot therewith. At the same time, network cross-connects and databases required by them are obviated. It should be noted, however, that the implementation of the method of the invention is not bound to a mobile network of the kind to be presented below, but the method can also be implemented in conventional networks.

FIG. 5 shows four base stations BTS1 . . . BTS4 of the mobile network and their common base station controller BSC. A common transmission link TL is provided between the base stations and their base station controller, and a combining element 41, 42 is located at least at one point of said transmission link, in which the digital signals arriving from the different base stations are combined to a common transmission link by using a logic operation. In the following, an example will be used in which the combining element is a digital adder comprising an AND gate and the common transmission link as well as the signals arriving from the base stations comprise a 2048 kbit/s PCM signal in accordance with the ITU-T recommendations G.703/704 (the E1 signal stated above).

The combination of channels may take place at one point only or may be distributed chained combination, as in the example of FIG. 5 which has two digital adders (references 41 and 42) in chain.

Figure 6:
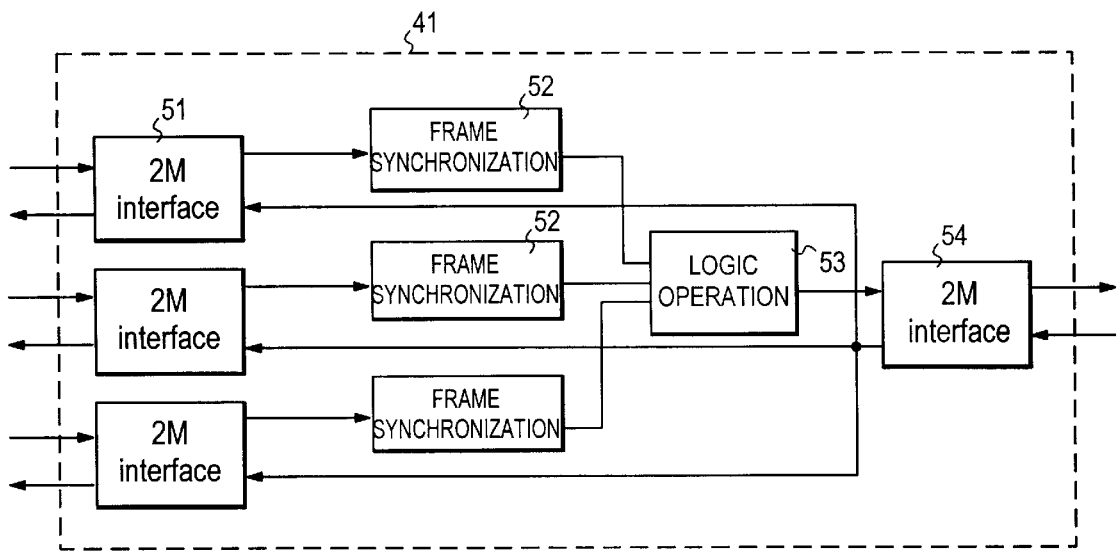
FIG. 6 shows a block diagram of an adder used in the network of FIG. 5.

A block diagram for the combining element is shown in FIG. 6, in which it has been presumed, as for element 41 in FIG. 4, that three base stations are connected thereto, each via a 2048 kbit/s interface of its own, and thus the base station end of the element has three parallel 2048 kbit/s interface circuits 51, one for each base station. Each interface circuit is a known interface in accordance with the ITU-T recommendations G.703/G.704. The number of base stations connected to one combining element may naturally vary.

The operation of the adder will first be described in the uplink direction (from base stations to base station controller).

Since the signals arriving from different base stations are in different phases, they must be frame synchronized in synchronization units. In the synchronization units, each base station signal is phased to the common frame structure in order that the base station signals may be transmitted over the common transmission link to the base station controller When the base station signals have been phased, they are supplied to a gate 53 carrying out a logic operation, in which a logic combination operation is performed on the phased tributaries bit for bit. In this exemplary case, the operation is a logic AND operation, and hence gate 53 is an AND gate.

The combined signal is supplied to an interface circuit 54 in accordance with recommendations G.703/G.704, which adapts the combined signal physically to the transmission link TL.

In the downlink direction, the 2048 kbit/s signal arriving at element 41 from the transmission link TL is distributed from input port 54 directly to all output ports 51.

In the network described above, transmission request bits are used in such a way that the active state (which corresponds to a transmission request) is a logical zero state. In that situation, the transmission request time slots of the different base stations can be combined by a digital addition operation of the kind described above. The time slots used for actual signalling (like the payload signals) are combined on the same principle.

Figure 7A:
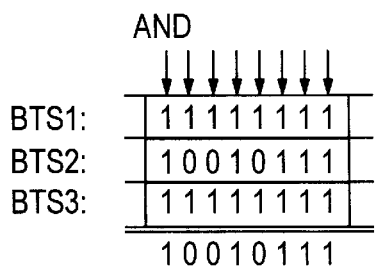
FIG. 7*a* illustrates the operation of the adder in a traffic time slot.
Figure 7B:
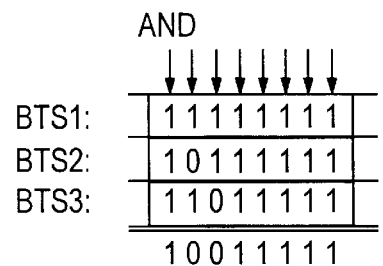
FIG. 7*b* illustrates the operation of the adder in a transmission request time slot.

FIG. 7a illustrates an addition operation performed by the AND gate 53 by depicting the signals sent by the base stations BTS1 . . . BTS3 connected to element 41 in a single traffic time slot, e.g. in time slot 2 which in this exemplary case has been allocated for the use of base station BTS2. Since the AND operation is performed bit by bit and since all bits in the time slot are available, eight AND operations are performed in the time slot in this case, each of which is denoted with an arrow. Since the entire time slot is allocated to base station BTS2, the other base stations in this time slot send the bit pattern "11111111", which allows the transmission of the active base station (BTS2) to get through as such. In the transmission request time slot, all base stations that have nothing to transmit similarly send the bit pattern "11111111", and if a base station wishes to send a transmission request, it sets the bit allocated to it to the logical zero state. Base station BTS1 then sends for example the bit pattern "01111111", base station BTS2 the bit pattern "10111111", base station BTS3 the bit pattern "11011111", etc. FIG. 7b illustrates the addition performed by the AND gate 53 in the transmission request time slot when base stations BTS2 and BTS3 simultaneously send a transmission request.

Figure 8A:
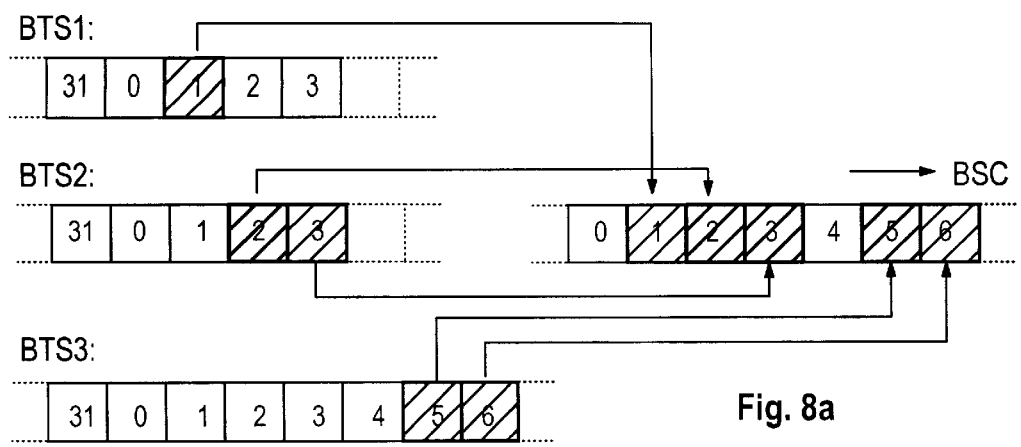
FIG. 8a shows the transmission principle to be implemented in the network of FIG. 5 from a base station to a base station controller.
Figure 8B:
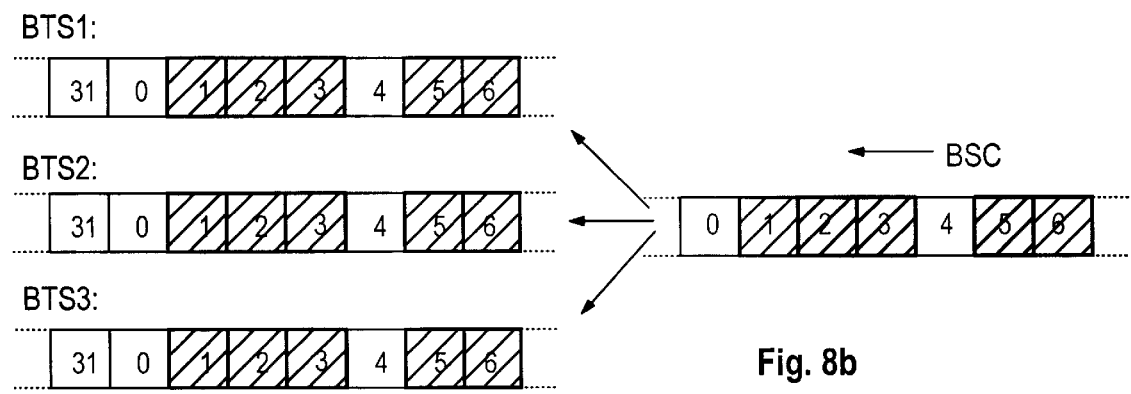
FIG. 8b shows the transmission principle to be implemented in the network of FIG. 5 from the base station controller to the base station.

FIGS. 8a and 8b illustrate the transmission performed in the network of FIG. 5 on frame level by depicting the uplink direction (from base stations to base station controller) in FIG. 8a and the downlink direction (from base station controller to base stations) in FIG. 8b. The figure shows by hatching the time slots that are allocated to each base station. As is apparent from the foregoing and is to be seen from FIG. 8a, the time slots allocated to the different base stations are "added" into the frame of the common transmission link. As is apparent from the foregoing and is to be seen from FIG. 8b, the time slots transmitted by the base station controller BSC are transferred as such to all base stations, and thus each base station picks from the frame the data of the time slots that have been allocated to said base station. On the common signalling channel, the base station can pick the information addressed to it for example by means of the address contained in the information.

Even though the invention has been described in the above with reference to examples in accordance with the accompanying drawings, it is obvious that the invention is not restricted to them, but it can be modified within the scope of the inventive idea set forth in the appended claims. As stated previously, the method of the invention can be implemented in networks of various kinds, but a network as described above, using a logic operation, is nevertheless particularly advantageous as it allows the transmission requests to be combined in a simple manner. The combining element used may be an element realizing another function than the AND function, in which case respectively the inactive base stations transmit in all traffic time slots a bit pattern on account of which the base station signal to which said time slot has been allocated passes through the element unchanged. For example an OR gate (gate 53) may be used in the combining element, in which case respectively the inactive base stations transmit in a time slot or in part thereof a mere logical zero string, and when a base station wishes to send a transmission request it sets the bit allocated to it to logical one state. The bit pattern transmitted by the inactive base stations may in principle be any fixed bit pattern, as long as the function of the combining element is changed in accordance with the bit pattern. This can be implemented for example in such a way that when a zero in the bit pattern changes into a one, the function of the combining element changes from an OR function to an AND function. There may also be more than one basic logic operations used in the combining element.

Furthermore, the use of the method is not limited to mobile networks, but it may be used in any network of a corresponding type. More than one bit may also be allocated from a transmission request time slot for the use of one base station, whereby the urgency level of the request, for example, may be encoded with the extra bits. In that case, the base station may assign signalling turns for example in such a way that request of a higher-priority urgency class supersede requests of a lower urgency level in the queue. If idle bits remain in the signalling time slot, they can be used for any suitable purpose.

What is claimed is:

1. A method for implementing signalling in a telecommunications network, particularly in a mobile network, in accordance with which method one network element (BSC) serves as a master element and several other network elements serve as slave elements (BTS1 . . . BTS4) sending a transmission request for signalling information to the master element which assigns transmission turns in accordance with received transmission requests, the signalling is implemented on a signalling channel common to the slave network elements, comprising at least one time slot of the transmission frame, or part of such a time slot, characterized in that in the transmission from the slave elements to the master element the capacity of the signalling channel used is divided into a first subchannel on which transmission requests are sent and to a second subchannel on which actual signalling information is sent, and the subchannel allocated to transmission requests is further divided between several different slave elements in such a way that a pre-determined bit from the same time slot of the transmission frame is assigned for the use of transmission requests of each slave element, and thus several different slave elements can send a transmission request simultaneously to the master element.

2. A method as claimed in claim 1, characterized in that the signalling channel is divided in such a way that one transmission frame only comprises one of the subchannels.

3. A method as claimed in claim 2, characterized in that the subchannels use the same time slot of the transmission frame.

4. A method as claimed in claim 1, characterized in that said predetermined bit is assigned for the use of one slave element only.

5. A method as claimed in claim 1, characterized in that in addition to said predetermined bit, at least one additional bit wherewith the urgency level of the request is communicated is assigned for the use of the transmission requests of each slave element.

6. A method as claimed in claim 1, for mobile communication network, characterized in that a common transmission link (TL) is established between several base stations and their common base station controller, the signals arriving from the different base stations being combined in a network element (41, 42) located at least at one point of said transmission link by means of a logic operation on a time slot basis into the time slots of the frame structure used in the transmission link in such a way that the signal of the base station to which said time slot is allocated passes unchanged through the network element.

* * * * *